Figure 1:
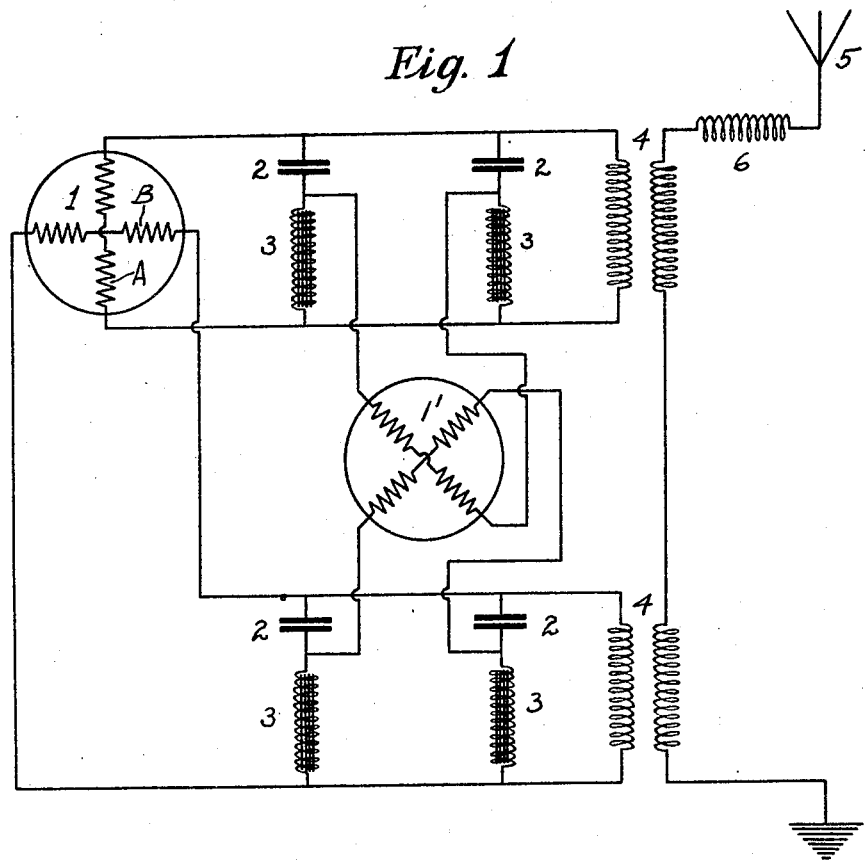

Dec. 17, 1929.  H. CHIREIX  1,739,948
ELECTRIC SIGNALING
Filed Nov. 29, 1924   3 Sheets-Sheet 1

INVENTOR
HENRI CHIREIX
BY
ATTORNEY

Dec. 17, 1929.   H. CHIREIX   1,739,948
ELECTRIC SIGNALING
Filed Nov. 29, 1924   3 Sheets-Sheet 2

INVENTOR
HENRI CHIREIX
BY
ATTORNEY

Dec. 17, 1929.   H. CHIREIX   1,739,948
ELECTRIC SIGNALING
Filed Nov. 29, 1924    3 Sheets-Sheet 3
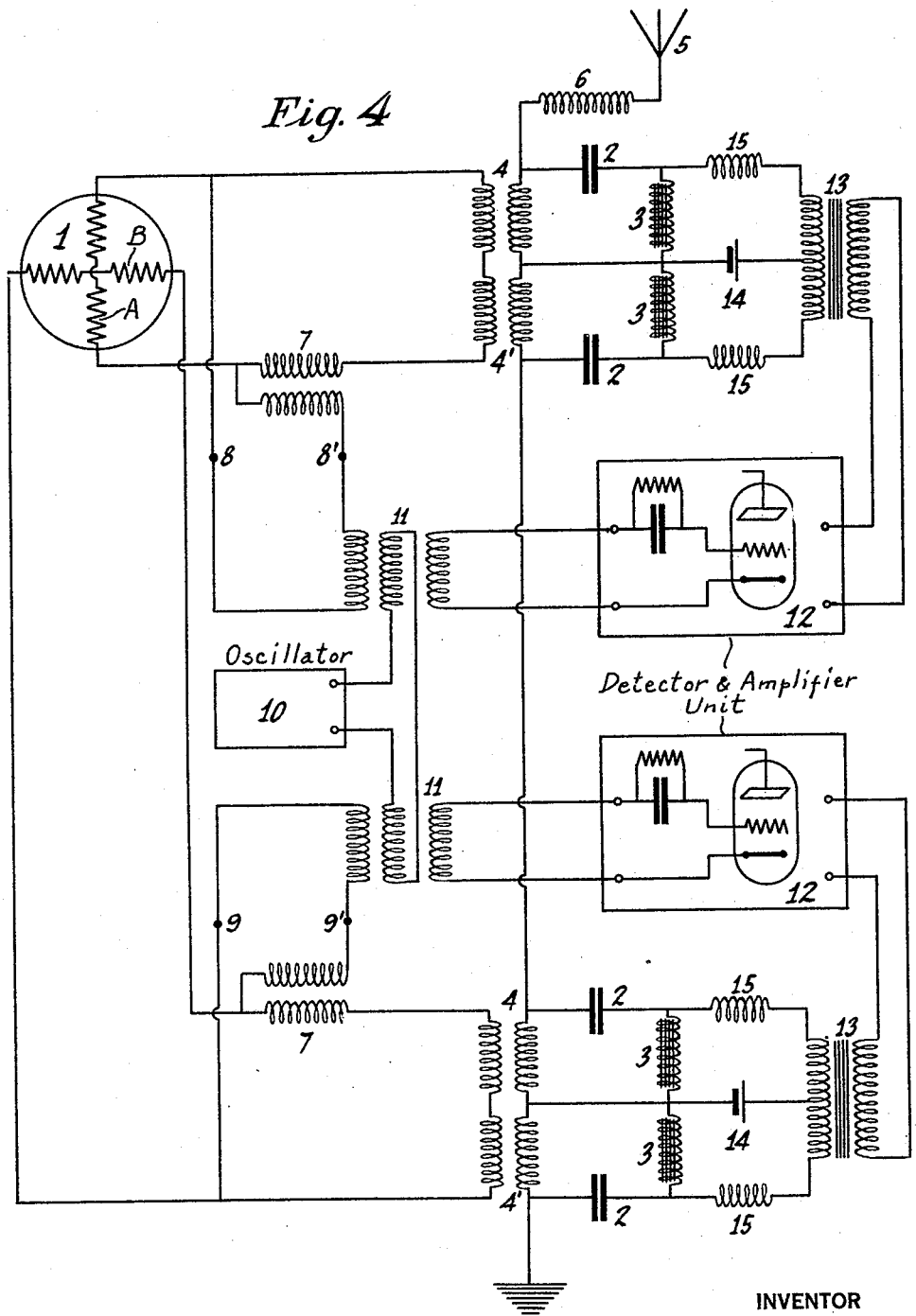
INVENTOR
HENRI CHIREIX
BY
ATTORNEY Patented Dec. 17, 1929

1,739,948

UNITED STATES PATENT OFFICE

HENRI CHIREIX, OF PARIS, FRANCE

ELECTRIC SIGNALING

Application filed November 29, 1924, Serial No. 752,873, and in France December 13, 1923.

The present invention relates to a method and improved arrangements adapted to the communications by modulated high frequency currents which present new properties and are susceptible of special applications.

It is already known that the frequency of a current furnished by a constant-frequency alternator can be modified by modulating this current with a generally lower frequency, and by then utilizing selective properties of resonant circuits or filters. For instance, if there is available a high frequency alternator or a valve equipment furnishing a frequency F, and if the output of the said generator is entirely modulated by the well known aid of modulating means such as, for instance, the magnetic modulator in which the magnet core is saturated by the alternating current of frequency $f$, one obtains a modulated voltage of this form, cosine $2\pi Ft$ cosine $2\pi ft$, resolvable into the two frequencies $(F+f)$ and $(F-f)$. If the output circuit, tuned, for instance, to the frequency $(F+f)$, offers a sufficiently high reactance for the frequency $(F-f)$, there there will practically be in this circuit only a current of the frequency $(F+f)$ of a practically constant amplitude. Indeed, selective circuits or filters being never perfect, there will always remain a little current of a frequency that is not desired, and, as a consequence a residual modulation which may become inconvenient.

This defect is, moreover, due to the fact that it is sought to obtain an output of substantially constant intensity from an input of variable power (the input annuls itself in effect twice per period of the frequency of modulation). The selective circuit must therefore maintain the oscillations to a high level of intensity even when the input annuls itself. It is well known that this is practically the case when the damping is low and the lower the damping is, the lower also is the attenuation of the intensity in the period of time given.

The present invention has as its object to obviate this drawback by the use of generators of the polyphase kind. Let us suppose that a two-phase alternator of high frequency is modulated by another two-phase alternator of a by far lower frequency. It will be easy to see that when the quantity cos $2\pi Ft$ cos $2\pi ft$ passes through the zero value, the quantity sin $2\pi Ft$ sin $2\pi ft$ passes through its crest value, in other words, that the modulated energy is never caused to disappear. As to the rest, there is evidently cos $2\pi Ft$ cos $2\pi ft$ − sin $2\pi Ft$ sin $2\pi ft$ = cos $2\pi(F+f)$ $t$. Whence it will be seen that, as a matter of fact, there is directly obtained a wave with a frequency $F+f$ without using any selectively acting circuit. It is to be noted that instead of the sum total of the frequencies, it would also be feasible to make available the difference between them by reversing the connections of a phase.

Figure 2:
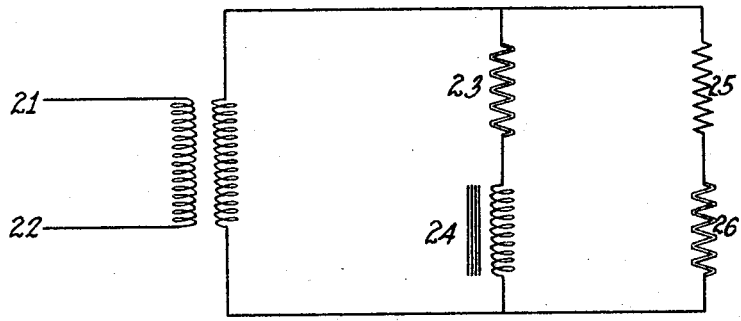
Figure 3:
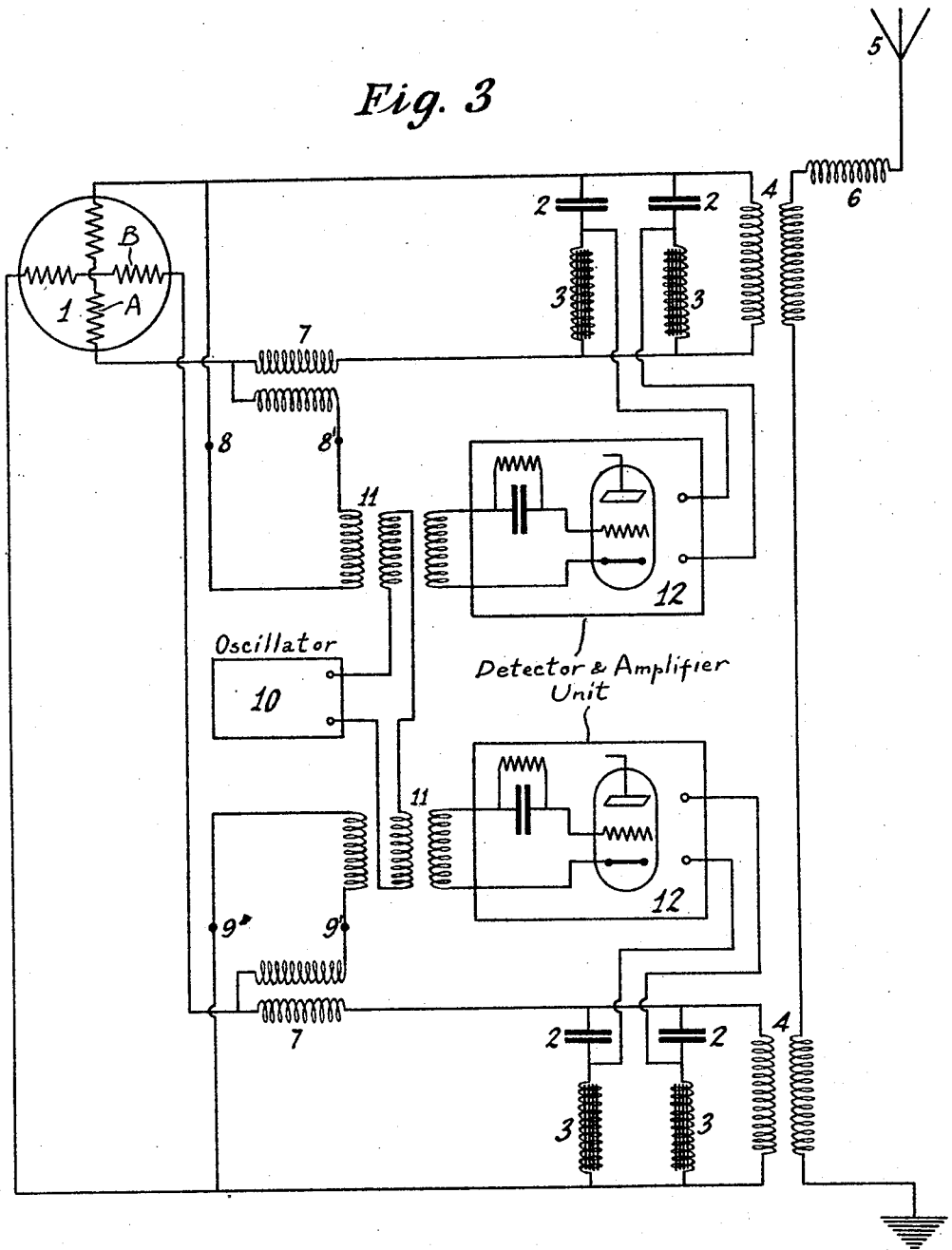

The invention will best be understood by reference to the following description taken in connection with the accompanying drawing in which Fig. 1 shows one form of the invention, Fig. 2 shows an arrangement that may be used in connection with Fig. 1 for wireless telephony, Fig. 3 shows a modification of the arrangement shown in Fig. 1, and Fig. 4 shows a second modification.

Referring to Fig. 1, which illustrates the invention when two alternators are employed at a radio telegraphic station, 1 represents a two-phase high frequency alternator of high power; 1' an alternator of medium frequency and low power serving for modulation purposes; 2, 2 stand for condensers in series with inductance coils 3, 3 of the saturated kind, said condensers being adjusted to a value so that for the maximum amplitude of the alternating current furnished by the alternator 1', the reactance of circuits 2, 3 annul each other. 4, 4 stand for coupling means with aerial 5, tuned by the aid of antenna inductance coil 6. It is to be noted that the machine 1' is a low-power machine furnishing a low frequency when compared with machine 1. Hence, it may be regarded to be an auxiliary machine.

Apart from the essential property as above pointed out, the device lends itself also to a great number of other applications, of which the following are particularly important:

1. If a frequency regulator excited by the antenna current of frequency $(F+f)$ is brought to act upon the generator producing current of frequency $f$ (that is to say, the auxiliary machine), the frequency of the radiated waves can be regulated equally well as by acting upon machine 1. This allows a ready means of regulation as set forth in my copending application, Serial No. 748,884, filed Nov. 10, 1924.

More particularly as the speed of the machine 1 is not in need of precise regulation, the said machine can be driven by means of a synchronous motor connected to a source having tolerable regularity.

2. The frequency of the outgoing waves can be changed by changing the speed of the auxiliary machine 1'.

3. Modulated wireless telegraphy is practicable at reduced power by working with only one phase of each of the alternators.

4. It is also possible to extend the scope of the invention to telephony. For this object, alternator 1' is replaced by a double valve amplifier furnishing two-phase speech currents. In this manner it is possible to carry on telephony known as wireless telephony on a single band without carrier wave, which, in order to be intelligible, must be received by the aid of a local heterodyne substantially tuned to the frequency F.

The term "two-phase speech currents" is in need of some further explanation. It is known that the investigation of the propagation of current along telephone lines, the use of Pupin coils, the study of filters, etc., is based upon the supposition that speech, by the intermediary of a cell and a microphone, gives rise to permanent sinusoidal currents of different frequencies (fundamental wave and harmonics). Experience, and only experience, is the sole justification for such an interpretation of things. Hence, the expression "two-phase speech currents" simply means that the variable currents (fundamental wave and harmonics) produced by the microphone are divided into two circuits of such characteristics that the relative amplitude of the different components is preserved equal in the said two circuits, and that the phase of each of these components is displaced one quarter of one period with reference to that of the same component in the other circuit.

Fig. 2 shows by way of example a means to produce such currents. The desired result is obtained by the aid of ordinary resistances, iron-core inductance coils (chokers), and skin-effect resistances which are represented in the diagram by the ordinary symbols used for resistances but shown in double lines. These resistances can, for instance, be constituted of ferro-magnetic wires of such thickness that, in the presence of telephone currents, penetration into the wire is not complete, whereby the effective resistance becomes a function of the frequency of the current flowing therethrough. It is known that for a convenient diameter of the wire used, the resistance is substantially proportional to the square root of the frequency of the current in question.

Referring to Fig. 2, 21, 22 stand for a transformer carrying the telephone current, 23 is a skin-effect resistance, 24, an iron-core inductance coil, 25 an ordinary resistance, and 26 another skin-effect resistance. These various elements are proportioned in such a fashion that at a frequency of 800 periods for example, the resistances of 23 and 25 are very high compared to the impedance of 24 and the resistance of 26, 24 and 26 being equal in absolute value for that frequency. It will then be seen that the currents in branches 23, 24, on the one hand, and in 25, 26, on the other hand, are substantially in phase with the electromotive force, the two branches having practically no self inductance. It follows therefrom that the voltages across the terminals of 24 and 26 are $\frac{\pi}{2}$ out of phase, one being developed across a resistance and the other across a reactance. It will then be seen that, as to magnitude, if the frequency becomes, say, 4 times greater, the voltage across the terminals of 26 becomes doubled owing to the increase in resistance of 26 due to the frequency (skin effect); on the other hand, the current in branch 23, 24, becomes half of what it was, and the voltage across the terminals of 24 becomes twice as great. Hence, the ratio of the amplitudes is preserved.

According to the invention, two voltages displaced in phase by $\frac{\pi}{2}$ and having equal amplitudes are developed across the terminals of 24 and 26 (Fig. 2). These voltages serve to excite two telephonic current amplifiers of identical construction, which at their output ends supply telephonic currents of equal amplitude but displaced in phase by $\frac{\pi}{2}$. These currents are each adapted to modulate respectively, one of the magnetic modulators 2, 3 of Fig. 1 in any well known manner, as for instance, by connecting in series with each modulator the output of one of the telephonic current amplifiers.

An arrangement which is capable of giving almost absolute constant frequency in accordance with the present invention consists in generating modulation currents of low frequency by the aid of interference between the oscillations of the main generator and the oscillations of strictly constant frequency from an auxiliary generator, and in detecting these currents, the currents having the frequency of the beats being, if necessary, amplified in order to bring them to act conveniently upon the modulators. It so happens that the differences in the frequency of the modulation current caused by the variations in the frequency of the main generator are equal and of opposite sign to these variations, and compensate the same in this manner, and quite accurately, in the working circuit in virtue of the method of regulation forming the subject-matter of my copending application mentioned above.

The invention will be more readily understood by reference to Fig. 3 which illustrates, though only by way of example, one way of carrying the invention into practice, as applied to a two-phase alternator. 1 is the alternator (two-phase) of high frequency furnishing the main energy; 2 and 3 are condensers and inductance coils of the saturated kind, respectively, arranged in each of the phases of the alternator, 4, 4 are couplings with the antenna 5 tuned by the aerial inductance coil 6 to the outgoing wave. 7, 7 are two transformers whose windings together have a reactance of mutual inductance equal to the reactance of that phase of the alternator to which they are connected. It is known that this arrangement has for effect to cause an electromotive force to appear between the terminals 8, 8' and 9, 9' equal to that of the alternator minus the ohmic drop. These transformers serve to shift the two phases of the main alternator an angle of 45°, one leading and the other lagging in order to thus cause the two phases to become co-phasal in the secondaries of transformers 7, 7 which may then be acted upon by the auxiliary generator 10.

10 represents a small local generator of high frequency, preferably a small triode outfit. This generator is regulated to the frequency of the waves to be emitted and effectively fixing the frequency of the waves sent out, as will at once be seen. This generator can fundamentally be of any desired construction. 11, 11 stand for two three-winding transformers connected in a manner as indicated in the diagram with transformers 7, the local source 10, and the amplifier detectors with 12. 12, 12, stand for two amplifiers with a detector tube being disposed ahead of them. These two amplifiers must be as identical as possible, and they feed the saturated self-induction coil 3.

The operation can be clearly understood especially after an examination of Figs. 1 and 2. Let us suppose that the local source 10 is correctly regulated so as to give oscillations of a frequency of 20,000 periods per second, and that the alternator, for instance, furnishes a current of 19,500 periods per second. It will then be readily understood that the two amplifiers 12, 12 will supply a current of 500 periods by detection of the beats. This current of 500 periods will modulate the energy supplied by each of the two phases as pointed out above, and the two modulations when superposed will again result in the aerial in a current of exactly 20,000 periods for a convenient relative sense of the couplings 4 and 4. Indeed, the beats at 500 periods are displaced in phase between one another by one-quarter period since they are themselves produced by two-phase currents superposed upon a current of only one phase (that of the local generator 10); hence, we get this expression: $\cos 2\pi Ft \cos 2\pi ft - \sin 2\pi Ft \sin 2\pi ft = \cos 2\pi (F+f)t$; where F and $f$ respectively the frequency of the alternator and that of the beats.

If, then, the alternator experiences a drop in speed, and falls off say, 1 period per second, the frequency of the beats will increase by 1 period, in such a manner that the frequency of the current sent into the aerial is absolutely kept constant. It must be noted that the alternator could give a higher frequency than the one to be sent out, say, 20,500; it is then necessary to deduct the frequency of the beats from that of the alternator, this being directly accomplishable by reversing the connections of one of the couplings 4.

The method presents all of the desirable conditions and features because the local generator can be considered as being of an absolutely invariable frequency, and there is no inertia that has to be overcome.

As to the rest, the supply may be entirely taken care of by an accumulator, recourse having to be had to a Faraday cage, the coupling with the amplifiers 12, 12, being made very loose, in brief, all necessary precautions may be adopted so as to make working possible at unchanging frequency.

Be it understood, in order to have a pure frequency in the antenna, that is, free from modulation, it is necessary that the modulators 2, 3, modulate the wave entirely, in other words, the currents furnished by the amplifiers 12, 12 should be regulated so as to reduce the reactance of the circuits 2, 3 to zero when the currents pass through their maximum value. It is moreover necessary that the couplings 4 should be so that the E. M. F.'s induced by the two phases will be neutralized.

Another arrangement is illustrated by way of example in Fig. 4 in which 1 is the two-phase alternator generating high frequency currents, 2 and 3 are condensers and saturated inductance coils respectively representing the magnetic modulating elements; 4, 4', are couplings between the alternator 1 and the aerial 5 tuned by the aid of the inductance coil 6 to the frequency of the waves to be sent out. 7, 7 the transformers whereby, between terminals 8, 8', on the one hand, and the terminals 9, 9', on the other hand, the two-phase voltages of constant amplitude and substantially independent of the load of the alternator, are obtained, 10 is the local generator governing the frequency; 11, 11 transformers by means of which the beats resulting from the interference between the frequencies of the alternator and the local generator are supplied to the amplifier and detector systems 12; 13, 13 finally are the output transformers of amplifiers 12. The secondary of these transformers, as will be noted, feeds the saturation coils 3. These coils are likewise passed by the current supplied by the source 14, and the inductance coils 15 are intended to prevent the flow of high frequency current in the secondaries of the transformers 13.

The grids of the amplifier-detector devices 12 are excited by the sum of the high frequency potentials due to the oscillator 10 and to the two phase alternator 1. In accordance with these impressed voltages on the grid of triodes 12 their plate current will contain a current having a frequency equal to the difference of the input frequencies; and for the sake of convenience this resultant frequency shall be termed the modulation frequency. The high frequency potentials due to the alternator 1 are phase displaced with reference to the two amplifiers 12, as are also the currents of modulation frequency supplied to the two tubes 12. In other words if one of these currents is at a zero value the other one is at its maximum. The secondaries of transformers 13 being united with source 14 and with the choke coils 15 are the seat of induced E.M.F.'s of a frequency equal to the difference between the frequencies generated by 1 and by 10. Let us assume for example, this to be fifty cycles. Then, if one of the condensers 2 is so constructed that its reactance is equal to the reactance of the saturated self inductance coil 3 with which it is associated when the latter is completely saturated, it follows therefrom that when any one of the self inductance coils 3 is completely saturated, the resultant impedance across the terminals of the transformer 4 and 4' will be reduced to zero, which means this secondary winding will be short circuited and the corresponding primary will transfer no energy from the alternator to the aerial. However, when the self inductance coil 3 is unsaturated, it presents a high impedance and ceases to short circuit the secondary of transformer 4 or 4'. It will thus be seen that the transfer of energy between the primary of transformer 4 and 4' is varied in accordance with the degree of saturation of the self inductance coils 3.

With regard to the time relation of the various elements, at zero time the potential across the primary terminals of the upper transformer 13 will be zero while the potential drop across the primary terminals of the lower transformer 13 will be of maximum value.

Under these conditions the two self inductance coils at the top of the drawing have average saturation provided by the direct current source 14, while the two self inductance coils shown at the lower part of the drawing have complete saturation for one and complete unsaturation for the other when the potential of the source 14 is properly chosen. This effect follows from the fact that in the one case the direct current adds its effect to that of the alternating current, while with the other coil the direct current neutralizes the effect of the alternating current. For the purposes of this description let us assume that the value of the source 14 is such that the coil 3 opposite lower transformer 4' is completely saturated. It will thus be seen that phase A of alternator 1 will transmit a moderate amount of power to the antenna, and the phase B of alternator 1 will transmit fully the energy generated through the lower transformer 4 but no energy at all through the transformer 4'.

It, therefore, follows that at zero time average energy is transmitted by phase A whereas phase B works at full power. An instant later corresponding to one quarter cycle of the modulation frequency, the two self induction coils 3 at the lower part of the drawing will be saturated to an average or moderate amount only by the source 14 because there is no potential across the terminals of the lower transformer 13; while one of the two upper self inductance coils 3 will be completely saturated, let us assume for example, the one opposite upper transformer 4. In consequence the phase B of the alternator will transmit an average amount of power to the antenna while the phase A will transmit the full energy to the antenna by the intermediary of upper transformer 4, and no energy at all through the upper transformer 4'. It will be seen further that at the instant corresponding to ¼ the period later of the modulation frequency the energy of phase A will be transmitted by an average amount to the antenna and the energy of phase 2 will be transferred fully to the antenna though the transfer this time will take place through the lower transformer 4' finally, at the time corresponding to ¼ period later of the modulation frequency, the energy of the phase B will be transmitted at an average amount to the antenna and the energy of phase A will be fully transmitted to the antenna, but in this case through the upper transformer 4'. This cycle is repeated over and over again in the same manner. It will thus be seen that during the periods of maximum energy transferred, transfer takes place from alternator to antenna successively through the lower transformer 4, the upper transformer 4, the lower transformer 4' and finally the upper transformer 4'. The cycle is then repeated.

The operation of the arrangement can be described as taking place in the following manner: When the waves furnished by the alternator come to interfere with the oscillations produced by the local generator, the first element of the amplifier 12 detects the beats in such a manner that the secondaries of the transformers 13 are passed by the two-phase currents having the frequency of these beats. These currents become added to, or deducted from, the direct current furnished by the source 14, so that the reactance of one of the circuits 2, 3, diminishes as the other one increases. The two couplings 4 and 4' of contrary sense furnish current to the antenna as function of the reactance of the circuits 2, 3, to the terminals of which they are connected, and it will therefore be seen that during a period of the modulation current it will first be the higher coupling 4 which furnishes the maximum energy to the aerial, then at the end of one-quarter period it is the lower coupling 4; another quarter-period later the upper coupling 4', and finally the lower coupling 4', whereupon the cycle is repeated over and over again. After a period of the modulation current has been completed, a period has been added to, or taken away from, the main current.

As pointed out above the transformers 4 and 4' effect the coupling in opposite senses. As a result of this at each quarter period of the frequency modulation the phase of the current induced in the aerial is either advanced or retarded with reference to the phase of the electro-motive force supplied from one of the windings of the alternator. When the energy after having been delivered by phase B, A is delivered by the phase B, the phase of the current in the antenna has either been advanced or retarded by a quarter period with reference to the E. M. F. set up in the phase A, and when the energy delivered by phase A is transmitted by the transformer 4' instead of by the transformer 4, the phase of the current in the antenna is either advanced or retarded by one-half period with reference to the phase of the electro-motive force set up in phase A. Thus for each complete period of the modulation frequency the phase of the antenna current with relation to the electro-motive force in one alternator phase is advanced or retarded by an angle of 360° and there is, therefore, brought about an increase or a decrease of one cycle in the frequency of the antenna current for each cycle of the modulation frequency.

While I have shown and described various preferred embodiments of my invention, I do not limit myself to the same but may employ such other modifications as come within the spirit and scope of my invention.

Having described my invention, what I claim is:

1. The method of radio signaling which comprises, generating polyphase currents of high frequency, generating polyphase currents of lower frequency than said first mentioned currents, simultaneously modulating each phase of said high frequency currents by means of a separate phase of said second polyphase currents, and radiating the resultant modulated frequency.

2. In a radio signaling system the combination of a polyphase generator of high frequency oscillations, a source of polyphase currents of lower frequency than said generator frequency, and means whereby each phase of said first mentioned generator is simultaneously modulated by a separate phase of said source of polyphase currents of lower frequency.

3. The method of radio signaling which comprises, generating polyphase high frequency oscillations, generating oscillations of a frequency differing from said first mentioned oscillations, combining said oscillations to produce beat currents, detecting and amplifying said beat currents and radiating said high frequency oscillations under control of said beat currents.

4. In a radio signaling system, the combination of a polyphase generator of high frequency oscillations, an aerial circuit coupled to each phase of said generator, a local oscillator coupled to each phase of said generator and adapted to produce beat currents therewith, means to detect and amplify said beat currents, and means responsive to said amplified currents to control the impedance of said aerial circuit whereby the transfer of energy from the generator to the aerial is controlled.

5. In a radio signaling system, means for generating continuous oscillations of high frequency, comprising a multi-phase generator of high frequency, a second multi-phase generator of low frequency for simultaneously modulating each of the phases of the first generator, and a utilization circuit for radiating the resultant frequency, said frequency being the sum of the frequencies of the two generators.

6. A radio signaling system comprising means for obtaining a constant resultant frequency, said means including a main multi-phase generator of high frequency subject to fluctuations, an auxiliary multi-phase generator of low frequency for simultaneously modulating each of the phases of the main generator, the frequency of said auxiliary generator varying automatically with the fluctuations of the main generator by the same amount but in opposite sense, and a utilization circuit for radiating the resultant frequency.

7. In a radio signaling system, means for generating continuous oscillations of high frequency, comprising a multi-phase generator of high frequency, a second multi-phase generator of low frequency for simultaneously modulating each of the phases of the first generator, and a utilization circuit for radiating the resultant frequency, said frequency being the difference of the frequencies of the two generators.

HENRI CHIREIX.